US005081463A

United States Patent [19]

Hariu et al.

[11] Patent Number: 5,081,463

[45] Date of Patent: Jan. 14, 1992

[54] METHOD AND SYSTEM FOR FORMING DESIRED RADIATION PATTERN WITH ARRAY ANTENNA

[75] Inventors: Kenichi Hariu; Isamu Chiba; Shinichi Sato; Seiji Mano, all of Kanagawa, Japan

[73] Assignee: Mitsubishi Denki Kabushiki Kaisha, Tokyo, Japan

[21] Appl. No.: 457,489

[22] Filed: Dec. 27, 1989

[30] Foreign Application Priority Data

Apr. 13, 1989 [JP] Japan .................................. 1-93793
Apr. 18, 1989 [JP] Japan .................................. 1-98032

[51] Int. Cl.5 .......................... H01Q 3/22; G01S 3/16
[52] U.S. Cl. .................................... 342/372; 342/379
[58] Field of Search ................ 342/372, 371, 379, 380

[56] References Cited

U.S. PATENT DOCUMENTS 3,704,464 11/1972 Drane, Jr. et al. .................. 342/379
4,186,398 1/1980 Minnett et al. ...................... 342/374
4,225,870 9/1980 Marner et al. ....................... 342/370
4,499,473 2/1985 Rao .................................... 342/372
4,849,763 7/1989 DuFort ............................... 342/372
4,872,016 10/1989 Kress .................................. 342/380

OTHER PUBLICATIONS

"Antenna Theory and Design"; Elliot, Robert S.; Prentice Hall Inc, 1981.
"Forming Method of Low Sidelobe Pattern of Conformed Array Antenna by Considering Element Density"; Hairu et al, IEICE, 11/18/88, A-P88-84.
"A Cylindrical Array Antenna for SSR Mode-S"; Tokunaga et al; IEICE National Convention; Optics & Radio Wave Division; 1986, p. 82.
"Formation of Low Sidelobe Pattern in Conformal Array Antenna"; Hairu et al; IEICE Spring Nation Convention; 1988 B-118.

*Primary Examiner*—Gregory C. Issing
*Attorney, Agent, or Firm*—Wolf, Greenfield & Sacks

[57] ABSTRACT

An array antenna system and a method of exciting an array antenna wherein antenna elements are arranged on a curved surface. A desired radiation pattern with an undesirable sidelobe being suppressed is provided by compensating for the irregular density of antenna elements and by matching the null positions of the actual radiation pattern and an ideal Taylor radiation pattern.

6 Claims, 14 Drawing Sheets

METHOD AND SYSTEM FOR FORMING DESIRED RADIATION PATTERN WITH ARRAY ANTENNA

BACKGROUND OF THE INVENTION

1. Field of the Invention

This invention generally relates to an array antenna system and, more particularly, to a method and system for providing a desired radiation pattern in a desired direction and for providing a desired sidelobe pattern by using a plurality of antenna elements such as arranged in a phased array antenna.

2. Prior Art

In conventional antenna systems having a plurality of antenna elements aligned in line or uniformly arranged on a plane, each of the antenna elements is connected to a phase shifter for changing the phase of a signal and an amplitude controller for adjusting the amplitude level by amplifying or attenuating the signal amplitude. The phase shifter controls the phase of the signal transmitted from or received by each of the antenna elements so that the direction of a beam emitted by the antenna system is steered and the beam of the antenna system is scanned. The amplitude levels of the antenna elements are adjusted by the amplitude controllers in such a manner that the amplitude distribution given by the antenna elements corresponds to a predetermined distribution, for example a Taylor pattern, whereby a resultant radiation pattern obtained by the antenna elements is provided with a desired sidelobe level.

Recently, in addition to the antenna system in which the antenna elements are arranged in line or on a plane, there has been an increasing desire for antenna elements to be disposed on a nonplanar surface with a radiation pattern having a desired sidelobe level. FIG. 1 shows an example of such a nonplanar arrangement which was shown in TOKUNAGA et al. "A Cylindrical Array Antenna for SSR Mode-S" IEICE National Convention. Optics & Radio Wave Division, 1986, p. 82. In FIG. 1, antenna elements 1 are arranged on a cylinder surface and connected to phase shifters 2 which are controlled by a phase shifter controller 3. The phase shifters 2 are connected to amplitude controllers 4 which adjust the amplitude of signals received by the antenna elements 1. The signals from the amplitude controllers 4 are combined by a power combiner 5 and supplied to a receiver 6.

In such an antenna system as mentioned above, the phase of each of the phase shifters 2 is changed by the phase shifter controller 3 so that a beam is scanned for carrying out receiver operations. At the same time, it is necessary for the amplitude level given through each of the amplitude controllers 4 to be appropriately adjusted in order to obtain a desired sidelobe level. An approach taken to the adjustment of the amplitude level in the prior art wast to, first, compute a number of resultant radiation patterns produced from the combination of the antenna elements 1 by using a plurality of parameters such as the arrangement shape of the antenna elements 1, the active sector angle, and value of edge-taper of the amplitude distribution supplied to the antenna elements 1. Next, selected is a readiation pattern having a desired sidelobe level, and then the amplitude level of each of the amplitude controllers 4 is set in accordance with the parameters for the selected pattern.

Since the prior art antenna systems are constructed as mentioned above, a number of arithmetic operations using a plurality of paramenters need to be carried out to obtain a radiation pattern having a desired sidelobe level in antenna systems in which antenna elements are arranged on a curved surface.

FIG. 2 shows another prior art which are disclosed in HARIU et al. "Formation of Low Sidelobe Pattern in Conformal Array Antenna" IEICE Spring National Convention, 1988, B-118. The array antenna shown in FIG. 2 includes antenna elements $A_1, A_2, \ldots A_M$ arranged on a curved surface, phase shifters $Pa_1, Pa_2, \ldots Pa_M$, amplitude controllers $At_1, At_2, \ldots At_M$. In order for the array antenna to provide a desired sidelobe level, each of the antenna elements must be provided with an appropriate excitation amplitude. The excitation amplitude $A_i$ ($i=1, 2, \ldots M$) is given by the following equation:

$$A_i = T_i \cdot W_i / E_i(\theta_i) \quad (1)$$

Where, $T_i$ represents the amplitude given to the antenna element of element number i when the antenna elements of the conformal array antenna are projected on a plane perpendicular to the main beam axis, $W_i$ represents a weighting factor for compensating the density of antenna elements on the projected plane, and $E_i(\theta_i)$ represents the amplitude of antenna element No. i's pattern in the main beam direction.

Since the excitation amplitude $A_i$ is determined as mentioned above in the prior art array antenna excitation, when a Taylor pattern is used for $T_i$, the positions of nulls of the actual pattern are different from those of the ideal Taylor pattern. As a result, the desired sidelobe level may not be obtained.

SUMMARY OF THE INVENTION

Accordingly, it is a primary object of the invention to overcome the foregoing problems and to provide an array antenna system copable of easily bringing about a radiation pattern with a desired sidelobe level.

In accordance with one aspect of the present invention, there is provided an antenna system comprising a plurality of antenna elements arranged on a curved surface, an amplitude distribution arithmetical means for computing an amplitude distribution to be inputted to the antenna element in order to obtain a desired resultant radiation pattern from the combination of the antenna elements, and an amplitude controlling means for adjusting the amplitude of signals transmitted from or received by the antenna elements in accordance with the amplitude distribution computed by said amplitude distribution arithmetical means, said amplitude distribution arithmetical means including means for calculating an amplitude distribution given to the antenna elements when the antenna elements are projected on a plane perpendicular to the main beam direction of the resultant rediation pattern, and a compensation means for compensating the amplitude distribution calculated by said calculating means in accordance with the density distribution of the antenna elements on the projected plane. The compensation is carried out by multiplying the amplitude distribution with a weighting factor $W_i = \cos \delta_i$ where $\delta_i$ represents the angle between the antenna element No. i and the direction of beam scanning.

By such an arrangement, the calculating means provides the amplitude distribution for the antenna elements in the case where the antenna elements arranged on a curved surface are projected on a plane perpendicular to the main beam direction of the resultant radiation pattern of the antenna elements, and then the compensation means compensates the calculated distribution in accordance with the density of the antenna elements on the projected plane so that the influence of the inequality of antenna density on the projected plane upon the resultant radiation pattern is removed, whereby a desired radiation pattern is easily formed.

In accordance with another aspect of the present invention, there is provided a method of exciting an array antenna system comprising the steps of finding the position of nulls of an ideal Taylor pattern and numerically or analytically finding the excitation amplitude and phase necessary for nulls of the radiation pattern of the array antenna system to coincide with the nulls of the ideal Taylor pattern.

Thus, first the null positions of the ideal Taylor pattern are obtained, and then the amplitude and phase for exciting each element of the array antenna is calculated so that the nulls of the real directional pattern are formed at the Taylor pattern null positions, whereby a desired Taylor radiation pattern is easily provided.

In accordance with a further aspect of the present invention, there is provided a method of exciting an array antenna system comprising the steps of finding the angle position of nulls of an ideal Taylor radiation pattern, numerically or analytically finding the excitation amplitude and phase necessary for forming the null positions of a radiation pattern of the array antenna on the same positions as the nulls of the ideal Taylor pattern, selecting an undesirable sidelobe which has a level higher than the peak sidelobe level of the ideal Taylor radiation pattern out of sidelobes generated by the numerically or analyticelly found excitation amplitude and phase, and numerically or analytically finding the excitation amplitude and phase necessary for forming the null positions of the radiation pattern of the array antenna at the angle position of the undesirable sidelobe as well as at the angle position of the nulls of the ideal Taylor radiation pattern.

With such an arrangement, undesirable sidelobes are suppressed and a more desirable radiation pattern can be obtained.

BRIEF DESCRIPTION OF THE DRAWINGS

For a better understanding of the invention, reference is made to the accompanying drawings, in which.

DESCRIPTION OF THE PREFERRED EMBODIMENTS

Figure 1:
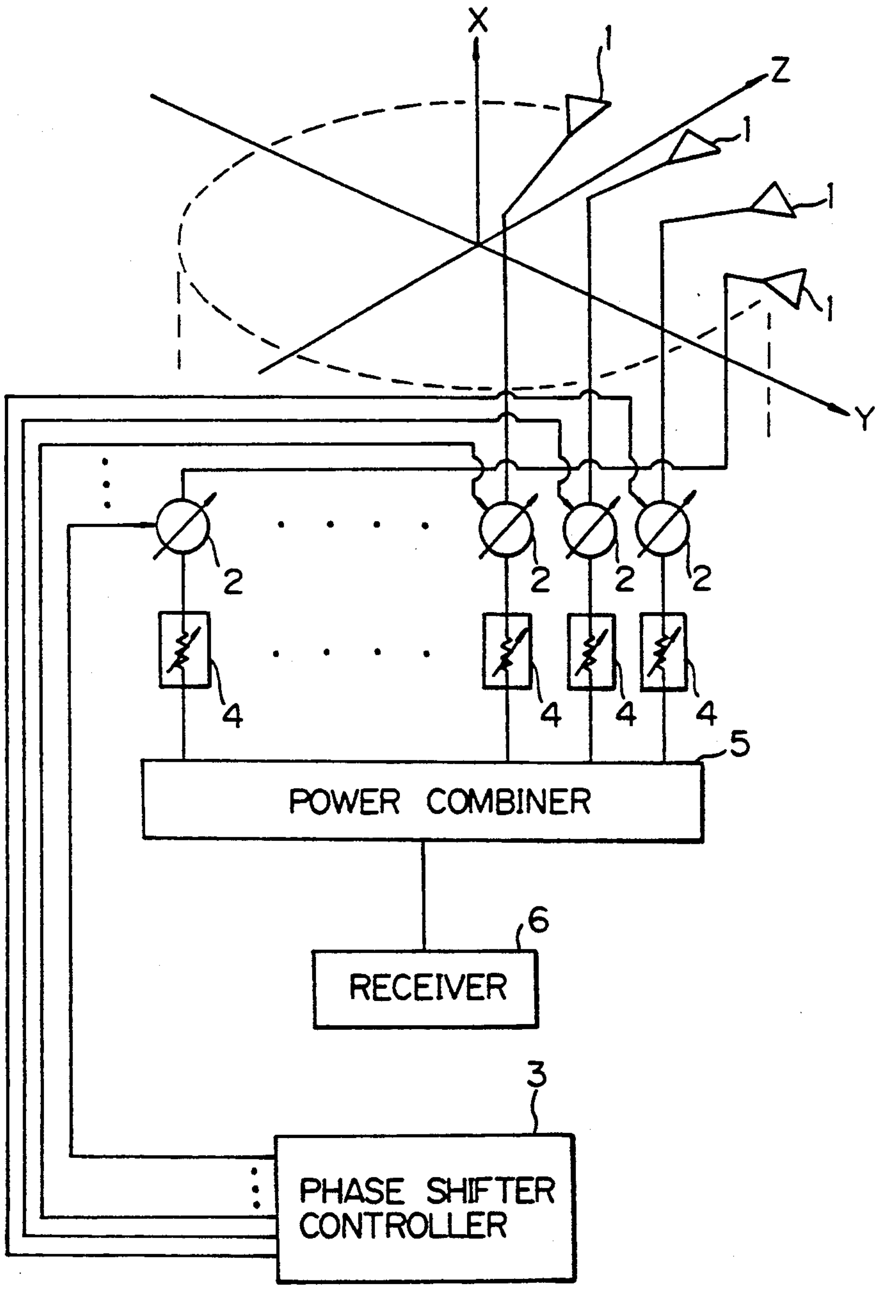
Fig. 1 PRIOR ART
FIG. 1 is a schematic block diagram illustrating a nonplanar array antenna in the prior art.
Figure 3:
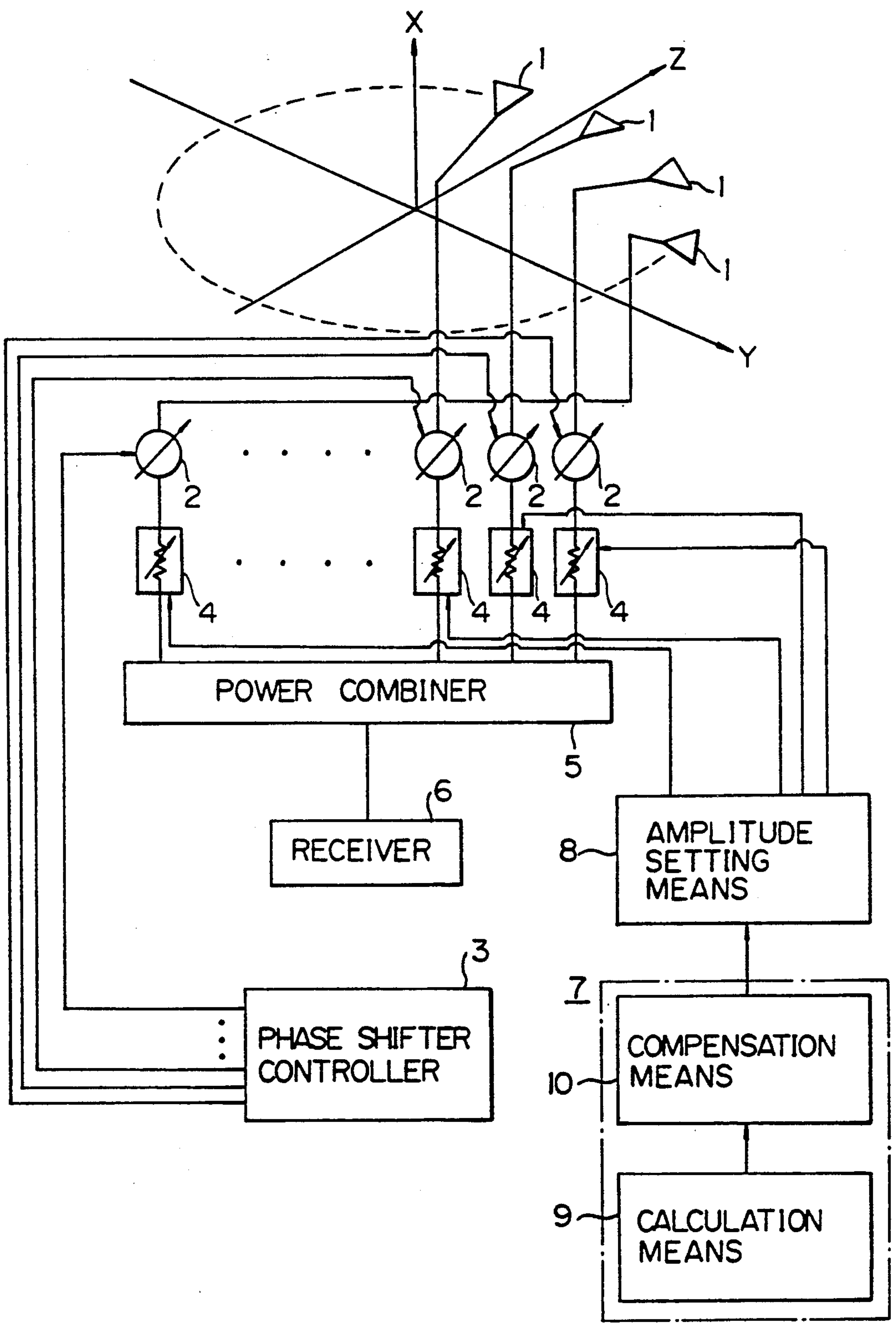
FIG. 3 is a schematic block diagram illustrating an antenna system of an embodiment in accordance with the present invention.

Referring to FIG. 3, there is shown the schematic block diagram illustrating an antenna system of an embodiment in accordance with the present invention. In FIG. 3, the components having the same reference numeral as that in FIG. 1 are similar to those shown in FIG. 1. In accordance with the present invention, there are provided an amplitude distribution operation means 7 and an amplitude setting means 8. The amplitude distribution operation means 7 carries out arithmetic operations for producing an amplitude distribution to be supplied to antenna elements 1. The amplitude setting means 8 calculates an amplitude level to be applied to each of the amplitude controllers 4 on the basis of the amplitude distribution given by the amplitude distribution operation means 7 and applies the calculated amplitude level to the amplitude controllers 4. The amplitude distribution operation means 7 consists of a calculation means 9 which computes an amplitude distribution to be applied to the antenna elements 1 when those antennas are projected on a plane and a compensation means 10 which modifies the computed amplitude distribution to adapt the distribution to the antenna elements 1 arranged on a curved surface.

Figure 4:
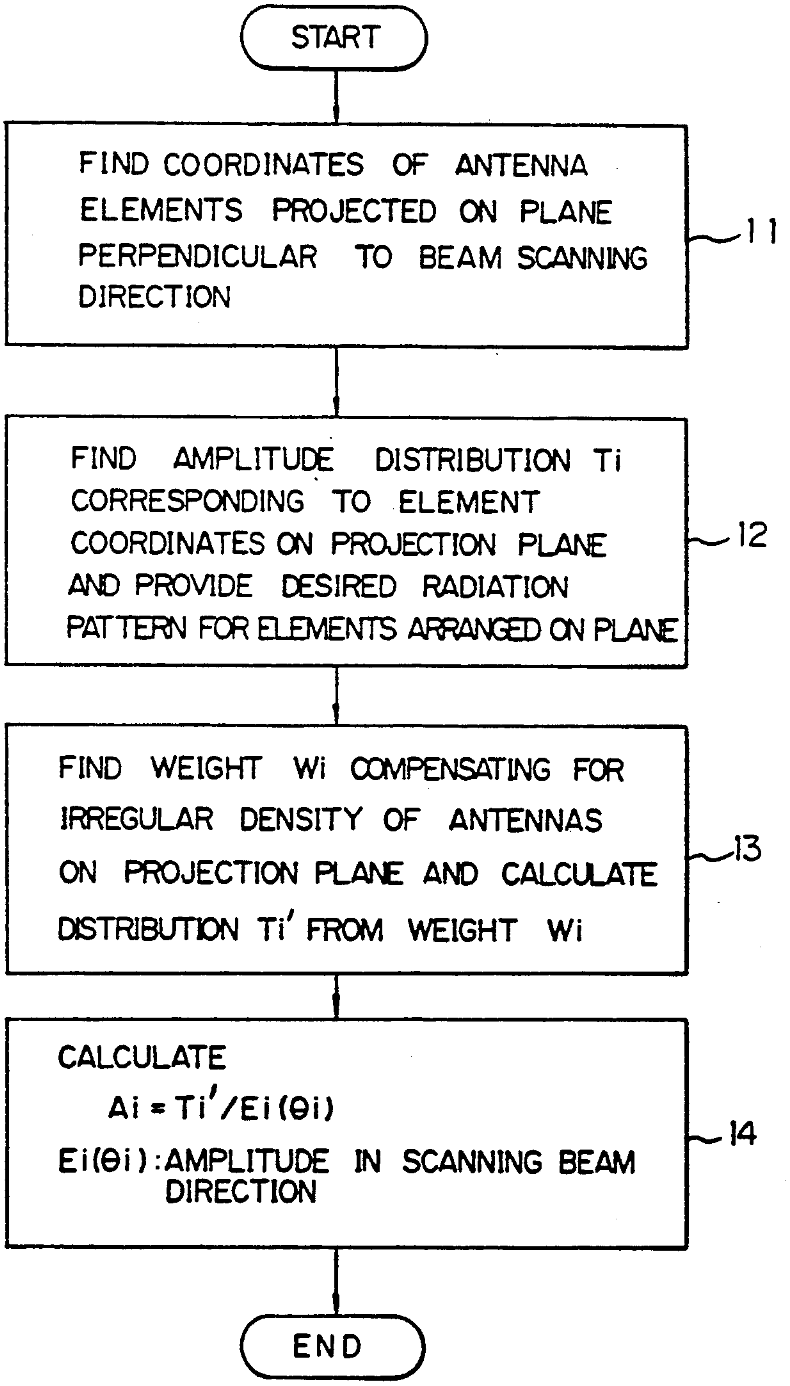
FIG. 4 is a flowchart showing the operation of the antenna system of FIG. 3.
Figure 5:
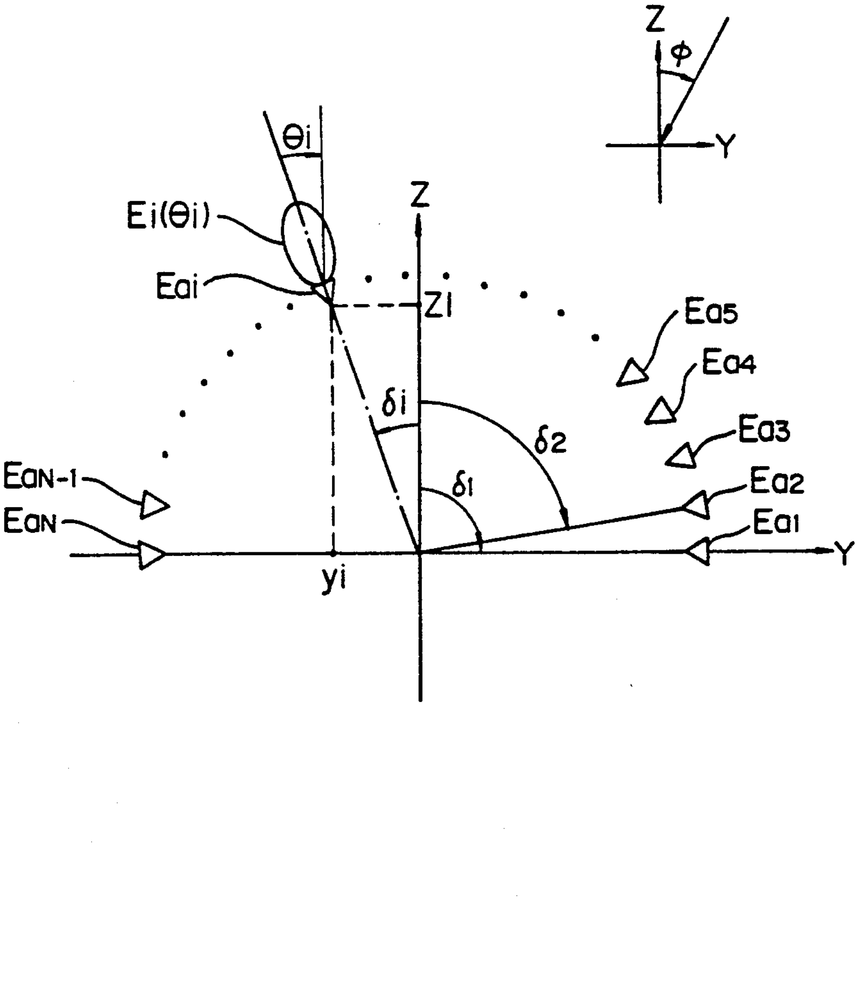
FIG. 5 is a diagram illustrating the arrangement of antenna elements shown in FIG. 3.

A beam scanning operation is carried out by changing the phase of phase shifters 2 under control of a phase shifter controller 3. In order to generate a radiation pattern having a desired sidelobe level, it is necessary for an amplitude level from each of the amplitude controllers 4 to be appropriately adjusted. The appropriate amplitude is produced by the calculation means 9, the compensation means 10 and the amplitude setting means 8 in such a manner as shown in the flowchart of FIG. 4. In connection with FIG. 4, FIG. 5 serves for understanding the operation described in the flowchart. In FIG. 5, antenna elements $Ea_1, Ea_2, \ldots Ea_N$ correspond to the antenna elements 1 arranged in a YZ plane in FIG. 3. An angle $\phi$ represents the angle from an axis Z. It is assumed that the direction of the scanning beam at a point of time is $\phi=0°$ and the amplitude levels applied to $Ea_1, Ea_2, \ldots, Ea_i, \ldots Ea_N$ are $E_1(\theta_1), E_2(\theta_2), \ldots, E_i(\theta_i), \ldots, E_N(\theta_N)$, respectively.

First, coordinates of the antenna elements $Ea_1, Ea_2, \ldots, Ea_i, \ldots Ea_N$ in the case where the positions of those elements are projected on a plane (hereinafter, referred to as a projection plane) perpendicular to the scanning beam ($\phi=0°$) are obtained by the calculation means 9 (Step 11). As a result of the projection of the coordinates $(y_1, z_1), (y_2, z_2), \ldots, (y_i, z_i), \ldots (y_N, z_N)$ of the antenna elements in the YZ plane, the coordinates $(y_1, 0), (y_2, 0), \ldots, (y_i, 0), \ldots (y_N, 0)$ are obained.

Next, the amplitude distribution to be applied to the antenna elements is computed. There is a known distribution, for example Taylor distribution, capable of bringing about a desired radiation pattern for antenna elements arranged in line or on a plane. The levels of amplitude $T_1, T_2, \ldots, T_i, \ldots T_N$ for the antenna elements $Ea_1, Ea_2, \ldots, Ea_i, \ldots Ea_N$ are computed by using the known equation, the amplitude distribution $T_i$ corresponding to the coordinates on the projection plane (Step 12). However, the amplitude distribution $T_i$ can provide the desired radiation pattern when the antenna elements are uniformly arranged in line or on a plane. In fact, the known arrangement of antenna elements on the projection plane is not uniform. In other words, the density of antenna elements adjacent to the Z axis is relatively low and the density at the both ends distant from the Z axis is relatively high. If the equation suitable for the uniformly arranged antenna elements is used for systems such as this embodiment wherein the element density is not uniform, the obtained amplitude distribution $T_i$ cannot cause a desired radiation pattern to be produced, more particularly the radiant power at a lower antenna density portion is relatively low and the radiant power at a higher antenna density portion is relatively high.

Next, a correction factor is calculated by a compensation means 10 in order to compensate for the influence of the irregularity of the density of antenna elements on the projection plane (Step 13), the correction factor is herein-after referred to as a weight $W_i$. The weight $W_i$ is given as $$W_i = \cos\delta_i \qquad (2)$$

where $\delta_i$ represents the angle between an antenna element $Ea_i$ and the Z axis (FIG. 5). Thus, the compensated amplitude distribution $T_i$ is the follwing equation:

$$T_i' = T_i \cdot W_i = T_i \cdot \cos\delta_i \qquad (3)$$

Next, an amplitude level $A_i$ to be supplied to each of the amplitude controllers 4 through the amplitude setting means 8 is computed (Step 14). Assuming that the amplitude in the direction of the main beam of the element $Ea_i$ is $E_i(\theta_i)$ as shown in FIG. 5, the amplitude level $A_i$ becomes as follows:

$$A_i = T_i'/E_i(\theta_i) = T_i \cdot W_i/E_i(\theta_i) \qquad (4)$$

Thus, a radiation pattern having a desired sidelobe level can be obtained by providing the amplitude controllers 4 connected to the antenna elements $Ea_1$, $Ea_2$, . . . , $Ea_i$, . . . $Ea_N$ with the amplitude level $A_i$ which can be easily found as mentioned above.

Figure 6:
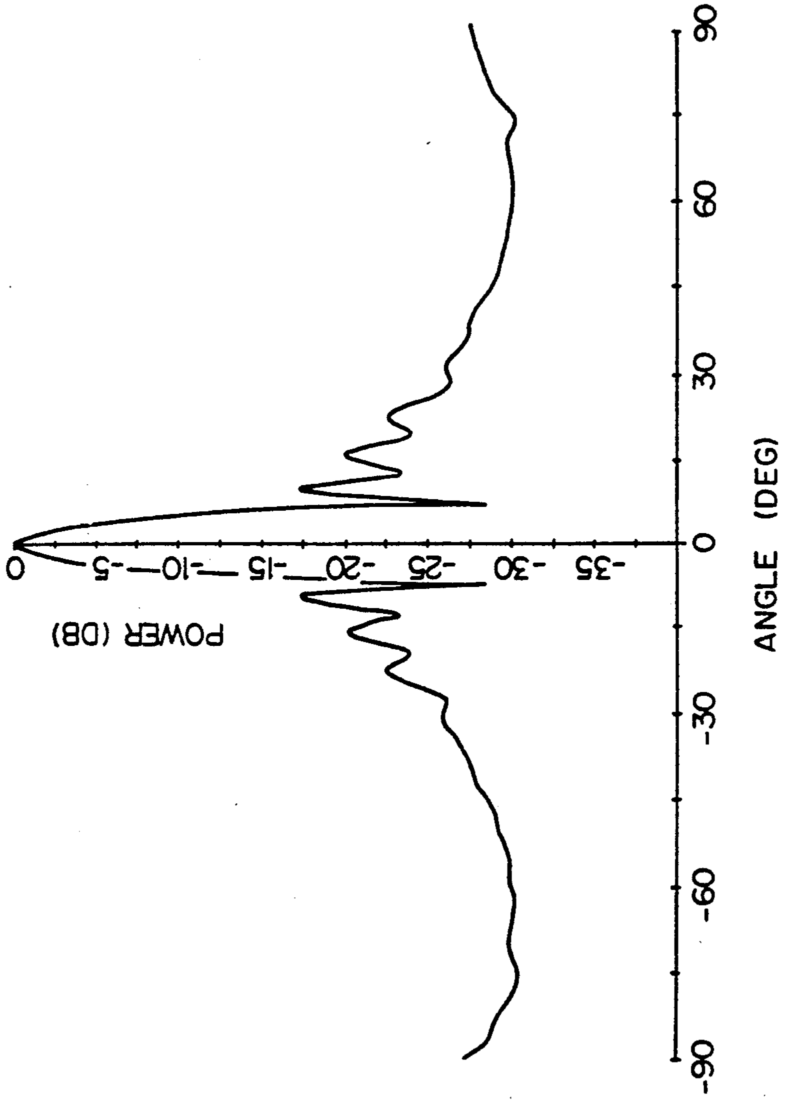
FIG. 6 is a graph showing characteristics of a radiation pattern without compensation.

FIG. 6 shows characteristics of a radiation pattern without using the weight $W_i$, that is, the amplitude levels applied to the amplitude controllers 4 are calculated on the basis of the amplitude distribution $T_i$, and then the calculated levels are supplied to the controllers 4 without compensation, wherein the Taylor distribution of −25 dB is used for the amplitude distribution $T_i$. However, the sidelobe level of −25 dB is not satisfied as can be seen from FIG. 6.

Figure 7:
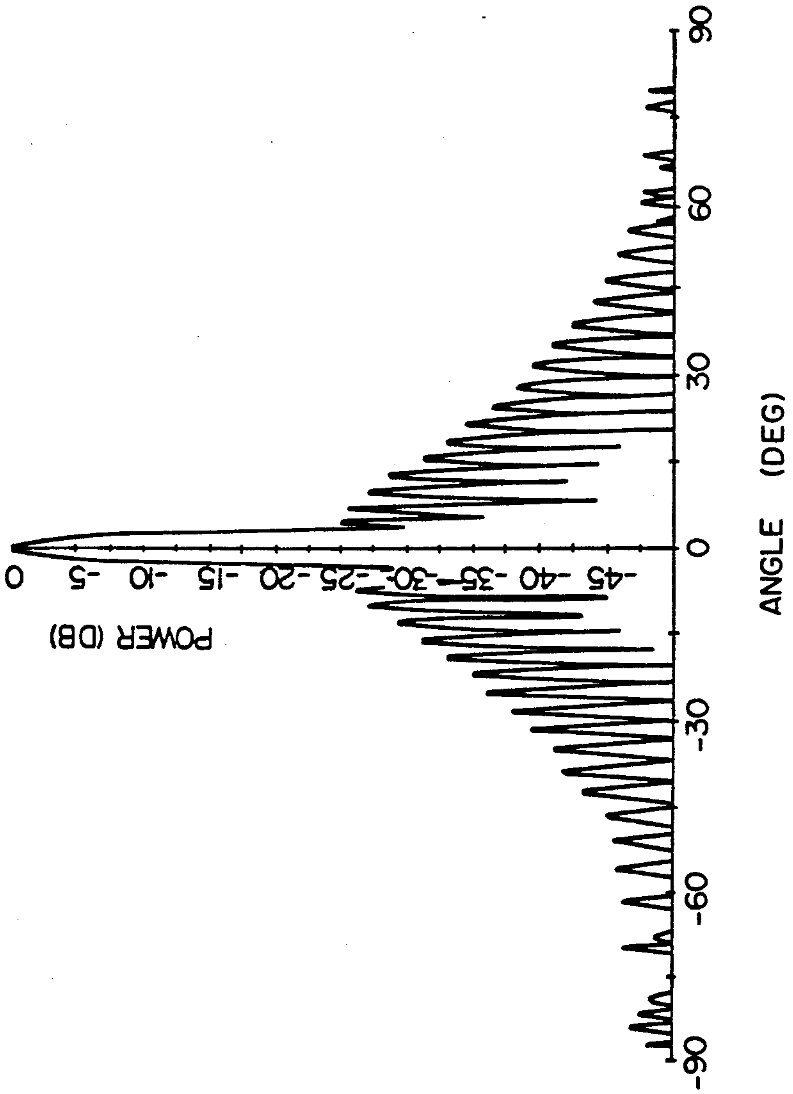
FIG. 7 is a graph showing characteristics of a radiation pattern after compensation.

On the other hand, FIG. 7 shows characteristics of a radiation pattern with compensation according to the present invention, that is, the Taylor distribution of −25 dB is used for the amplitude distribution $T_i$ and the compensation is made using the weight $W_i$, and then the amplitude levels supplied to the amplitude controllers 4 are set in accordance with the modified $T_i$. As can be seen from FIG. 7, the desired radiation pattern in which the sidelobe level of −25 dB is satisfied is provided in accordance with the present invention.

Thus, in accordance with the present invention, a desired radiation pattern is obtained for a short time even if antenna elements are arranged on a curved surface, whereby the present invention is particularly useful for such an application as a radiation pattern is frequently changed for a short time.

Figure 2:
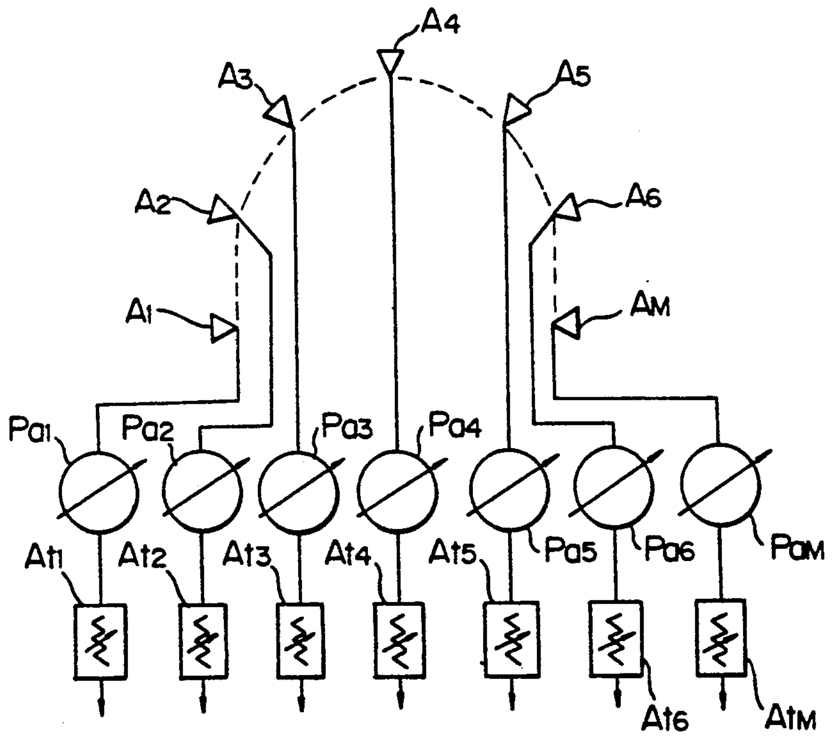
Fig.2 PRIOR ART
FIG. 2 is a schematic diagram showing another nonplanar array antenna in the prior art.
Figure 8:
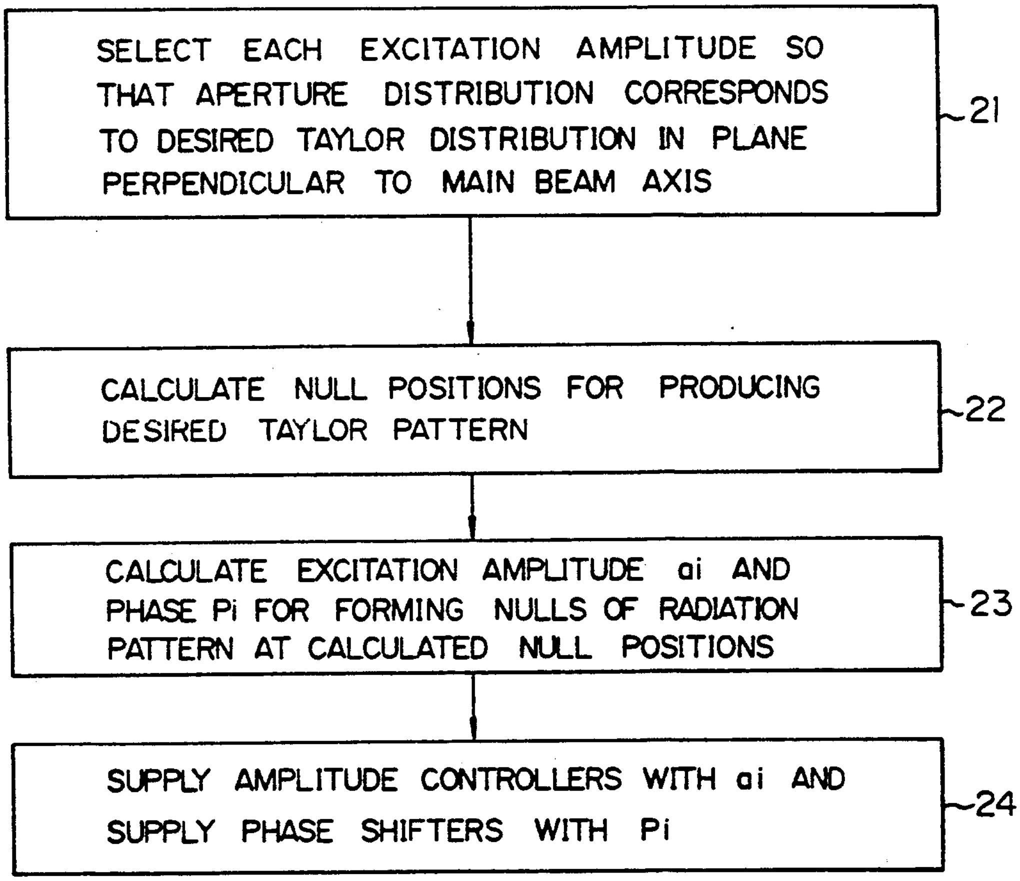
FIG. 8 is a flowchart showing a method of computing an excitation amplitude and phase for an array antenna in accordance with the invention.

FIG. 8 is a flowchart showing a method of computing the excitation amplitude and phase for an array antenna in accordance with another embodiment of the present invention. The method of this embodiment is intended for use in such an array antenna as shown in FIG. 2, wherein antenna elements are disposed along a portion of a circle at regular intervals.

Figure 9:
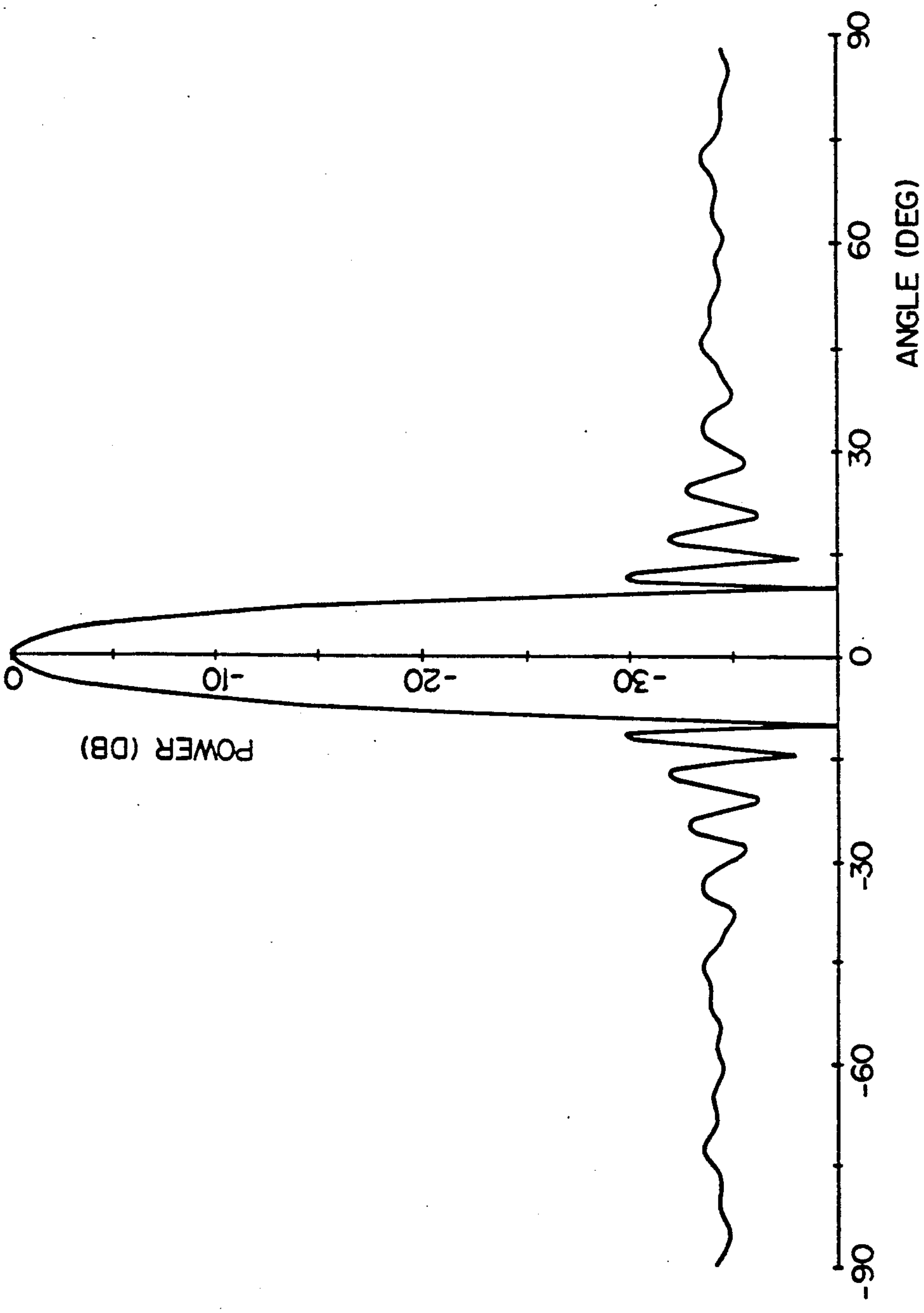
FIG. 9 is a graph of a radiation pattern without compensation.

In FIG. 8, an initial radiation pattern is first formed in a Step 21. In the embodiment, each excitation amplitude for each of the antenna elements is selected in such a manner that an aperture distribution corresponds to a desired Taylor pattern in a plane perpendicular to the main beam axis. FIG. 9 shows a radiation pattern obtained in the Step 21 when the Taylor distribution of −35 dB is used as the desired Taylor pattern. As can be seen in FIG. 9, the sidelobe level of −35 dB is not accomplished. The reason is that the positions of nulls of the actual Taylor pattern are shifted.

Next, the positions of nulls for providing the desired Taylor radiation pattern are calculated in a Step 22. The equation $U_n$ representing the null positions is generally given by the following:

$$U_n = n[A^2+(n-0.5)^2/A^2+(n-0.5)^2]^{\frac{1}{2}} \qquad (5)$$

where $\bar{n}$ = the number of nulls, n = the n-th null, $A = \log[b+(b^2-1)^{\frac{1}{2}}]/\pi$, and 20 log b = sidelobe level (dB).

Next, in a Step 23, the excitation amplitude and phase necessary for forming the nulls of the actual radiation pattern on the same positions as the calculated nulls. More particularly, the desired values of the amplitude and the phase are given by the excitation amplitude $a_i$ (i = 1, 2, . . . M: element number) and the excitation phase $P_i$ which yield the minimum value of the following equation F:

$$F = \sum_{n=1}^{n} \left| \sum_{i=1}^{M} E_{in}(\theta) a_i e^{jP_i} \right|^2 \qquad (6)$$

where $E_{in}(\theta)$ represents the degree of contribution of an antenna element $A_i$ in the $U_n$ direction. It should be noted that the excitation amplitude $a_i$ and the excitation phase $P_i$ may be obtained by an analytical method instead of the aforementioned numerical method.

Figure 10:
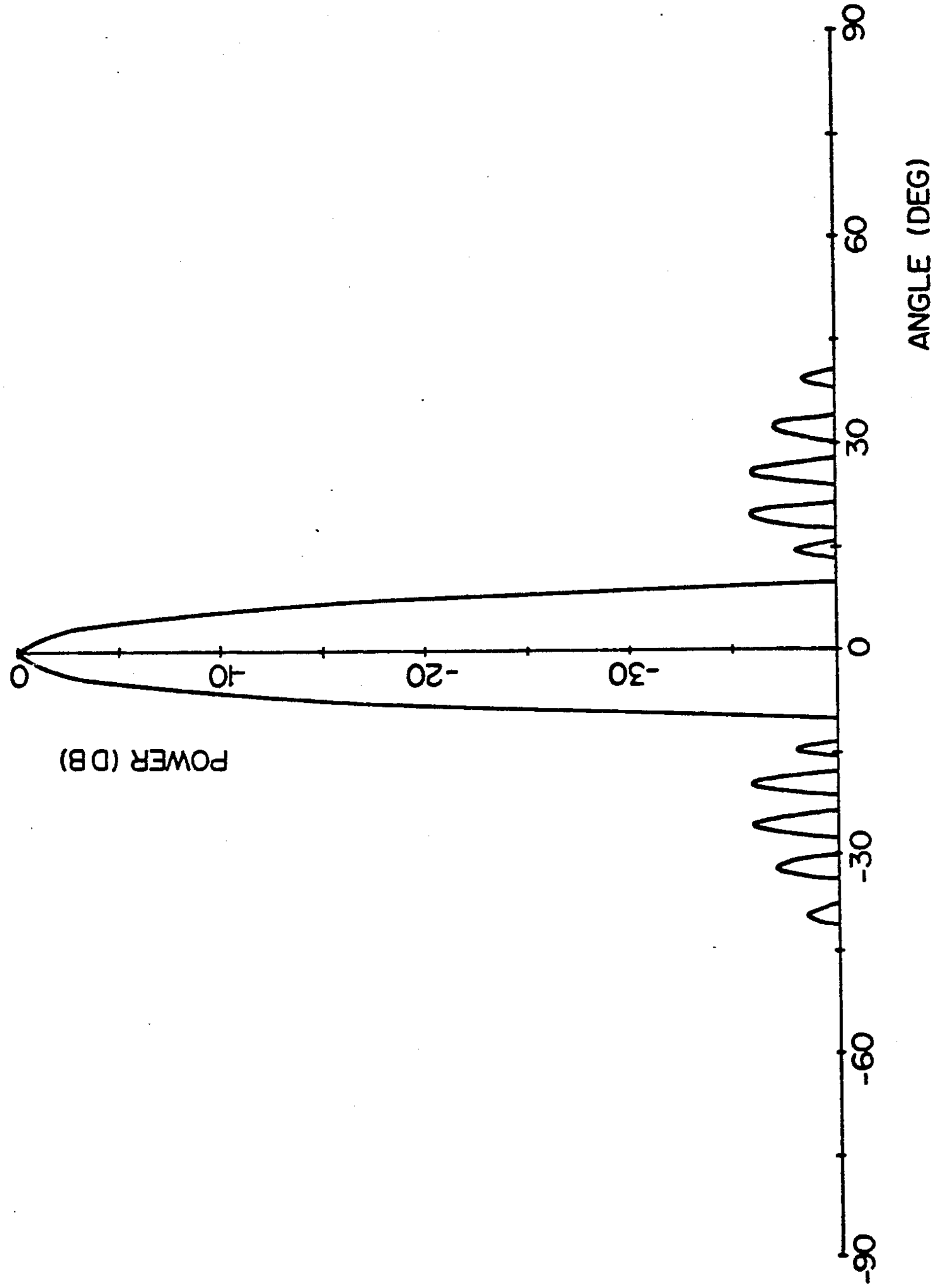
FIG. 10 is a graph of a radiation pattern after compensation.

Next, the desired Taylor radiation pattern is obtained by supplying the amplitude controllers $At_i$ ($At_1$–$At_M$: FIG. 2) with the calculated excitation amplitude $a_i$ and supplying the phase shifters $Pa_i$ ($Pa_1$–$Pa_M$: FIG. 2) with the calculated excitation phase $P_i$ in a Step 24. As a result, the Taylor radiation pattern of −35 dB is obtained as shown in FIG. 10.

As described above, in accordance with the present invention, the actual null positions of a radiation pattern are formed coincidentally with the null positions of a desired Taylor radiation pattern, whereby a desired radiation pattern is easily obtained with a desired sidelobe level. Since a single lower sidelobe pattern is formed, the excitation amplitude and phase for a desired Taylor radiation pattern is obtained for a short operation period.

Figure 11:
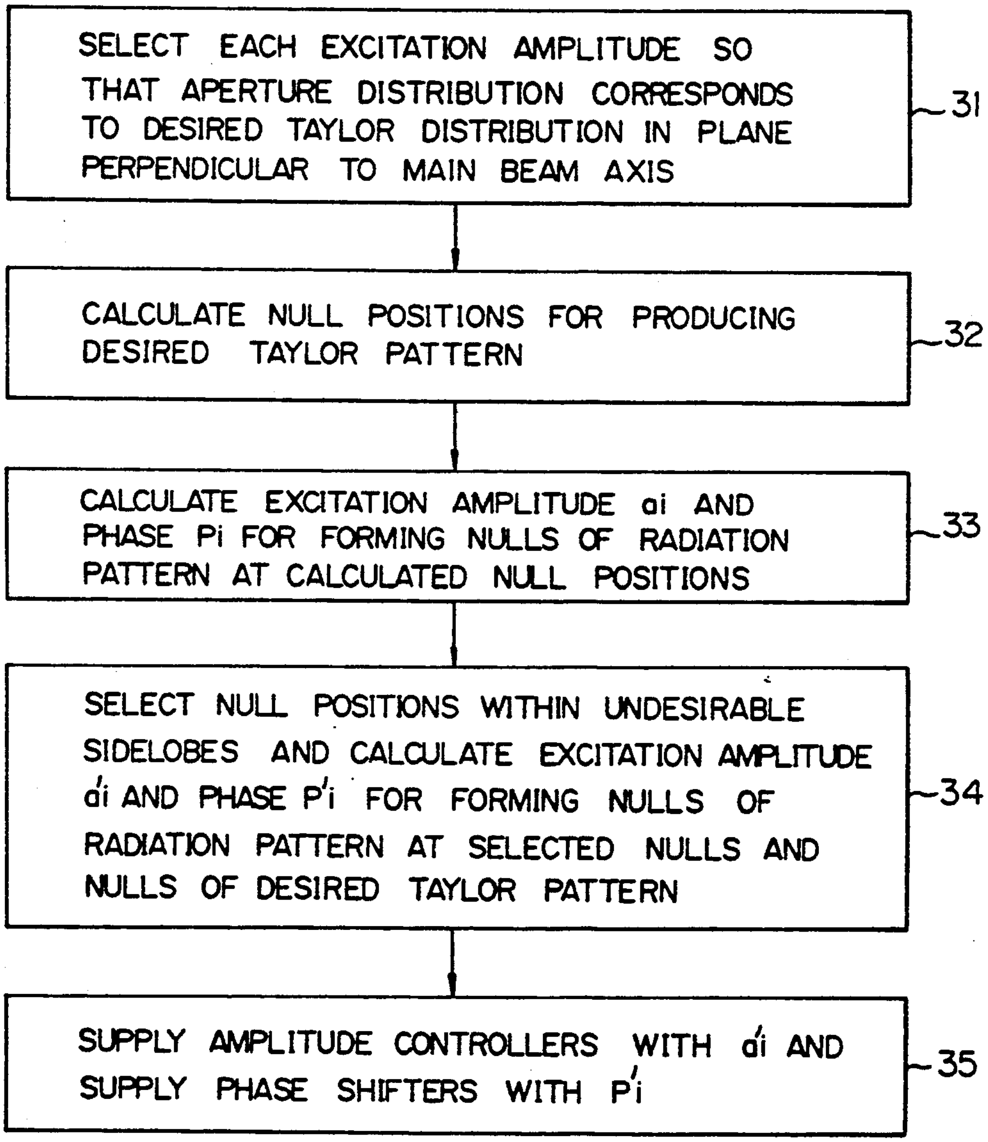
FIG. 11 is a flowchart showing a method of computing an excitation amplitude and phase for an array antenna in accordance with another embodiment of the invention.

FIG. 11 is a flowchart showing a method of computing the excitation amplitude and phase for an array antenna in accordance with a further embodiment of the present invention. The method of this embodiment is intended for use in such an array antenna as shown in FIG. 2.

Figure 12:
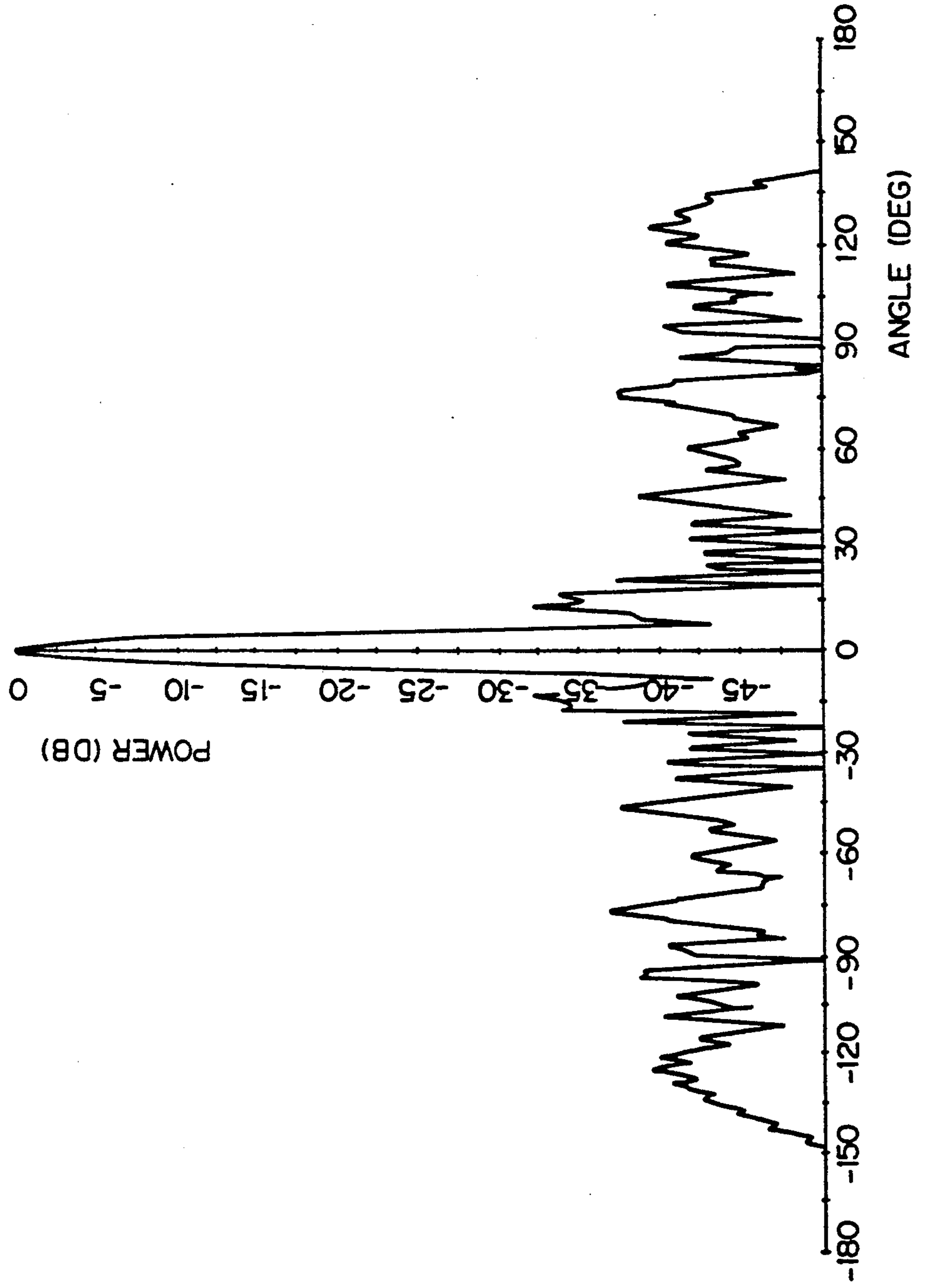
FIGS. 12–14 show radiation patterns at various steps of the method shown in FIG. 11.

First, an initial radiation pattern is formed (Step 31). In the embodiment, each excitation amplitude for each of antenna elements is selected in such a manner that an aperture distribution corresponds to a desirable Taylor pattern in a plane perpendicular to the main beam axis. FIG. 12 shows a radiation pattern obtained in the Step 31 when the Taylor distribution of −50 dB is used as the desirable Taylor pattern. As seen from FIG. 12, the sidelobe level of −50 dB is not satisfied. The reason is that the null positions do not coincide with suitable positions.

Next, the angle positions of nulls for producing the desired Taylor radiation pattern are calculated (Step 32). The equation $U_n$ providing the null positions is generally represented by the following:

$$U_n = \bar{n}[A^2+(n-0.5)^2/A^2+(\bar{n}-0.5)^2]^{\frac{1}{2}} \quad (5)$$

where $\bar{n}$ = the number of nulls, n = the n-th null, $A = \log[b+(b^2-1)^{\frac{1}{2}}]/\pi$, and 20 log b = sidelobe level (dB).

Next, the excitation amplitude and phase necessary for forming the nulls of the radiation pattern of the array antenna at the same positions as the calculated nulls. For that purpose, the values of the excitation amplitude $a_i$ (i=1, 2, . . . M: element number) and the excitation phase $P_i$ which cause the following equation F to be the minimum are found:

$$F = \sum_{n=1}^{\bar{n}} \left| \sum_{i=1}^{M} E_{in}(\theta) a_i e^{jP_i} \right|^2 \quad (6)$$

where $E_{in}(\theta)$ represents the degree of contribution of an antenna Element $A_i$ in the $U_n$ direction. Here, it should be noted that the excitation amplitude $a_i$ and the excitation phase $P_i$ may be obtained by a plane wave synthesizing method instead of the aforementioned numerical method.

Figure 13:
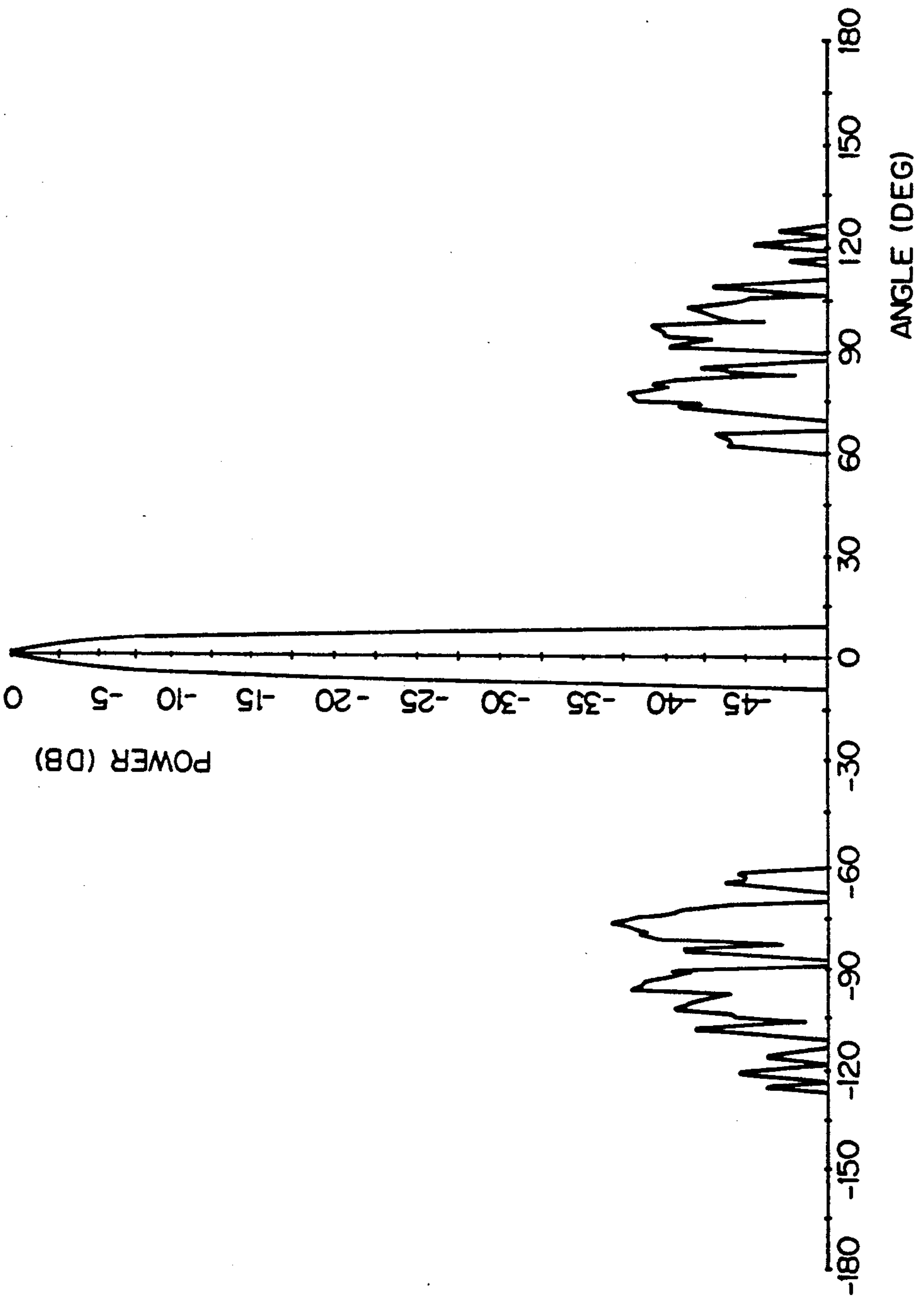

Next, the excitation amplitude $a_i$ is supplied to the amplitude controllers $At_1$–$At_M$ (FIG. 2) and the excitation phase $P_i$ is supplied to the phase shifters $Pa_1$–$Pa_M$ (FIG. 2) to produce a radiation pattern as shown in FIG. 13. As can be seen from FIG. 13, there are undesirable sidelobes greater than the set sidelobe level of −50 dB. In this embodiment, some null positions (here, K) existing in the undesirable sidelobes are selected at certain intervals, and then the excitation amplitude and phase necessary for forming the nulls of the radiation pattern of the array antenna at both the selected nulls and the nulls of the desired Taylor pattern (Step 34). For the purpose of finding such null positions, the following equation $F_x$ is used and the sought values are given by the excitation amplitude $a'_i$ (i=1, 2, . . . M: element number) and the excitation phase $P'_i$ which cause the $F_x$ minimum:

$$F_x = \sum_{n=1}^{\bar{n}} \left| \sum_{i=1}^{M} E_{in}(\theta) a'_i e^{jP'_i} \right|^2 + \quad (7)$$

-continued $$\sum_{k=1}^{K} \left| \sum_{i=1}^{M} E_{ik}(\theta) a'_i e^{jP'_i} \right|^2$$

where $E_{ik}(\theta)$ represents the degree of contribution of an antenna element $A_i$ in the direction of the nulls within the undesirable sidelobe. Here, it should be noted that the excitation amplitude $a'_i$ and the excitation phase $P'_i$ may be obtained by a plane wave synthesizing method instead of the aforementioned numerical method.

Figure 14:
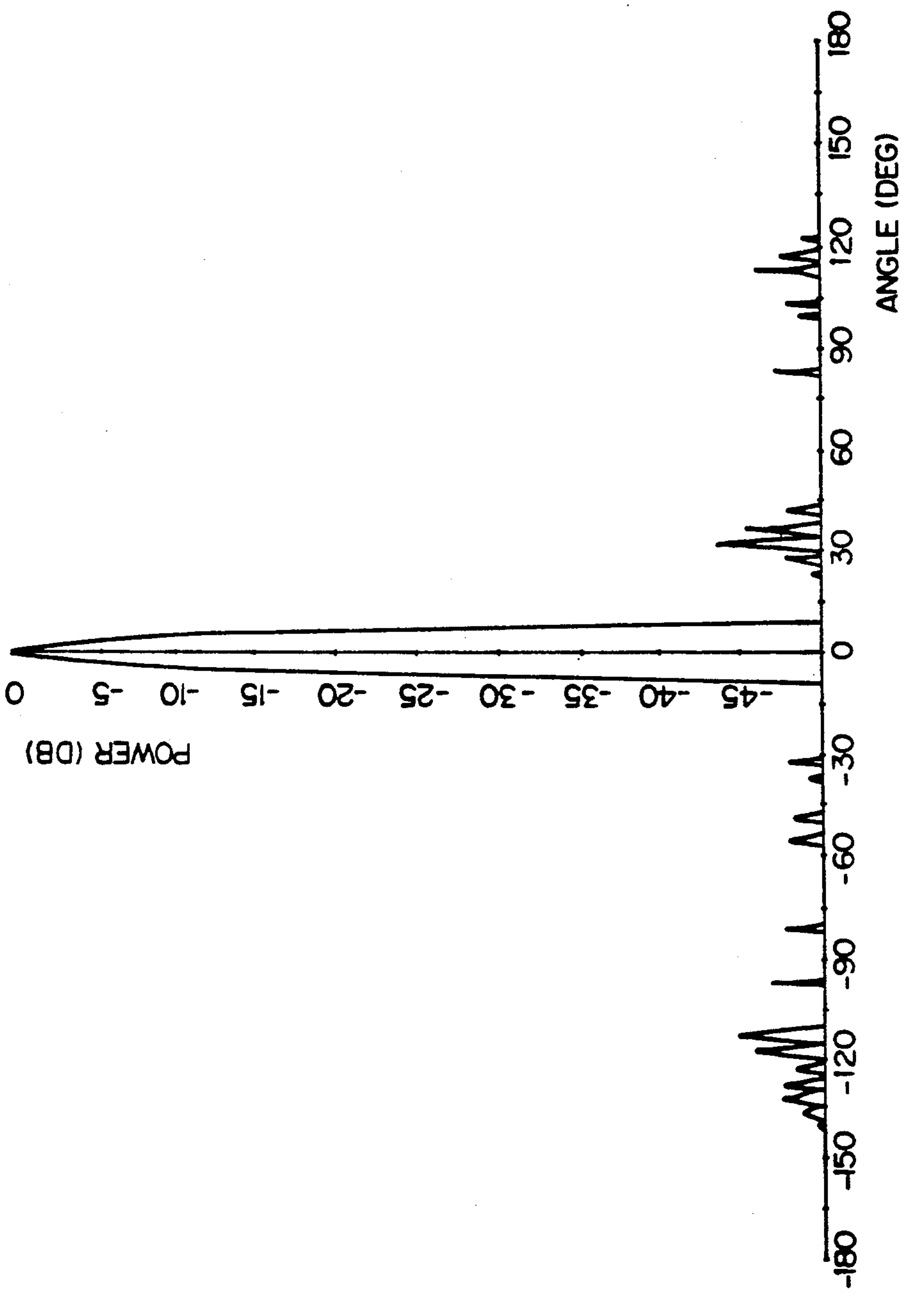

Finally, the excitation amplitude $a'_i$ is applied to the amplitude controllers $At_1$–$At_M$ (FIG. 2) and the excitation phase $P'_i$ is applied to the phase shifters $Pa_1$–$Pa_M$ (FIG. 2) to form a radiation pattern as shown in FIG. 14. As can be seen from FIG. 14, the sidelobes are greatly suppressed in comparison with FIG. 13.

Thus, since undesirable sidelobes are suppressed in addition to the maintaining of a desired Taylor pattern, a more desirable radiation pattern can be obtained for a short operating period.

Although the present invention is described with reference to certain embodiments, it will be apparent to those skilled in the art that various alterations and modifications can be made within the scope of the invention.

What is claimed is:

1. An antenna system comprising:

a plurality of antenna elements arranged on a curved surface;

an amplitude distribution arithmetical means for computing an amplitude distribution for supplying to said antenna elements in order to obtain a desired resultant radiation pattern from the combination of said antenna elements; and an amplitude controlling means for adjusting the amplitude of signals transmitted from or received by said antenna elements in accordance with the amplitude distribution computed by said amplitude distribution arithmetical means, said amplitude distribution arithmetical means including means for calculating an initial amplitude distribution for each of said antenna elements on the basis of the projection of said antenna elements on a plane perpendicular to the main beam direction of the resultant radiation pattern; and a compensation means for compensating the initial amplitude distribution for the effect of the density distribution of said antenna elements projected on a plane, by multiplying the initial amplitude distribution of each antenna element i with a weight factor $W_i$, where said weight factor $W_i = \cos \delta_i$, where $\delta_i$ represents the angle between the antenna element i and the direction of beam scanning.

2. An antenna system as set forth in claim 1 wherein said amplitude controlling means includes an amplitude setting means for calculating amplitude levels to be supplied to amplitude controllers, said amplitude controllers being connected to said antenna elements and changing the amplitude levels of said antenna elements in accordance with said calculated amplitude levels.

3. A method of exciting an array antenna system in which a plurality of antenna elements are arranged on a curved surface, comprising the steps of:

specifying an ideal Taylor radiation pattern;

calculating the angular positions of the nulls of said ideal Taylor radiation pattern; and calculating the excitation amplitude and phase necessary to form nulls in the resultant radiation pattern of the array antenna system in the calculated positions of the nulls of said ideal Taylor radiation pattern.

4. A method of exciting an array antenna system in which a plurality of antenna elements are arranged on a curved surface, comprising the steps of:

specifying an ideal Taylor radiation pattern;

calculating the angular positions of the nulls of said ideal Taylor radiation pattern;

calculating the initial excitation amplitude and phase necessary to form nulls in the resultant radiation pattern of the array antenna system in the calculated positions of the nulls of said ideal Taylor radiation pattern;

selecting an undesirable sidelobe from the sidelobes generated by said initial excitation amplitude and phase, said undesirable sidelobe having a level greater than the peak sidelobe level of said ideal Taylor radiation pattern; and calculating the excitation amplitude and phase necessary to form nulls in the resultant radiation pattern of the array antenna system in the angular positions of said undesirable sidelobe and in the calculated positions of the nulls of said ideal Taylor radiation pattern.

5. A method as set forth in claim 4 wherein the excitation amplitude and phase are numerically obtained.

6. A method of exciting an array antenna system in which a plurality of antenna elements are arranged on a curved surface said antenna elements having corresponding amplitude controllers, said method comprising the steps of:

specifying an ideal Taylor radiation pattern;

calculating the coordinates of each antenna element projected on a plane perpendicular to the direction of the main beam axis, calculating an amplitude distribution $T_i$ according to an ideal Taylor distribution corresponding to said coordinates of each antenna element i, calculating a weighting factor $W_i$ for each antenna element i where said weighting factor $W_i$ is equal to the cos $\delta_i$ where $\delta_i$ represents the angle between the antenna element i and the main beam axis;

calculating the compensated amplitude distribution $C_i$ by calculating the product of said amplitude distribution $T_i$ and said weighting factor $W_i$, for each antenna element i, calculating the amplitude level $A_i$ to be supplied to each antenna element by dividing said compensated amplitude distribution $C_i$ by the amplitude of the antenna element i in the direction of the main beam $E_i$; $(\theta_i)$;

providing said amplitude levels $A_i$ to the amplitude controllers associated with said antenna elements i.

* * * * *